Nov. 4, 1941.                L. D. MILLS ET AL                2,261,399
                       CYANIDE METHOD AND APPARATUS
                          Filed Dec. 23, 1938          3 Sheets-Sheet 1

INVENTORS
LOUIS D. MILLS
THOMAS B. CROWE
BY
ATTORNEY

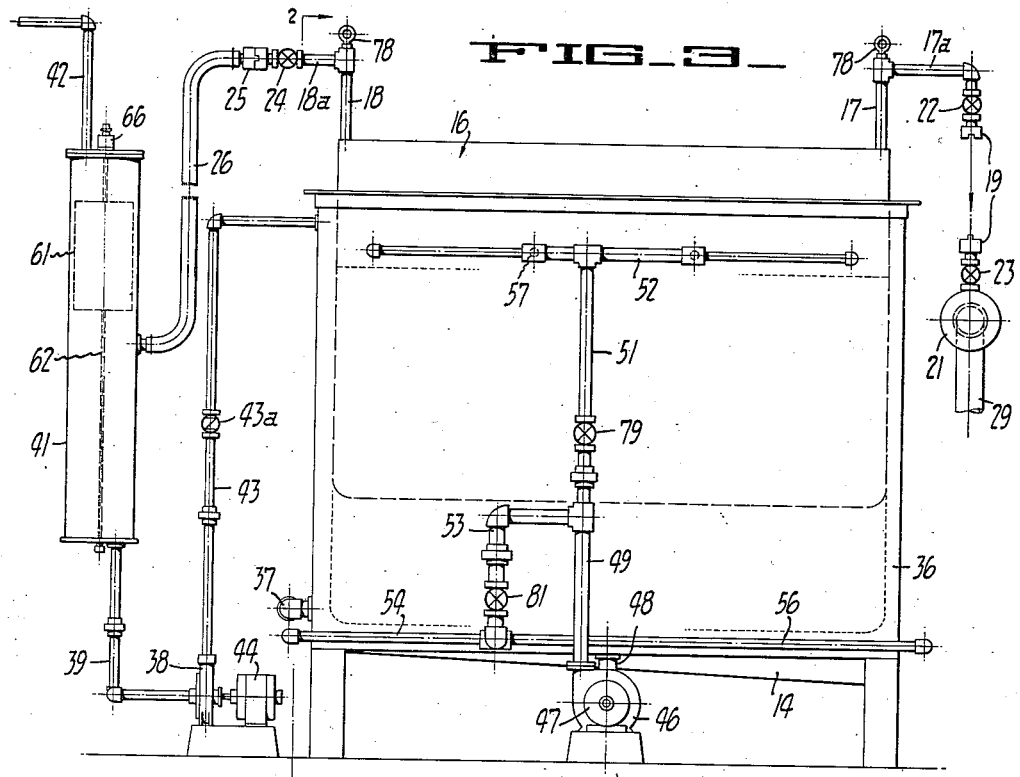
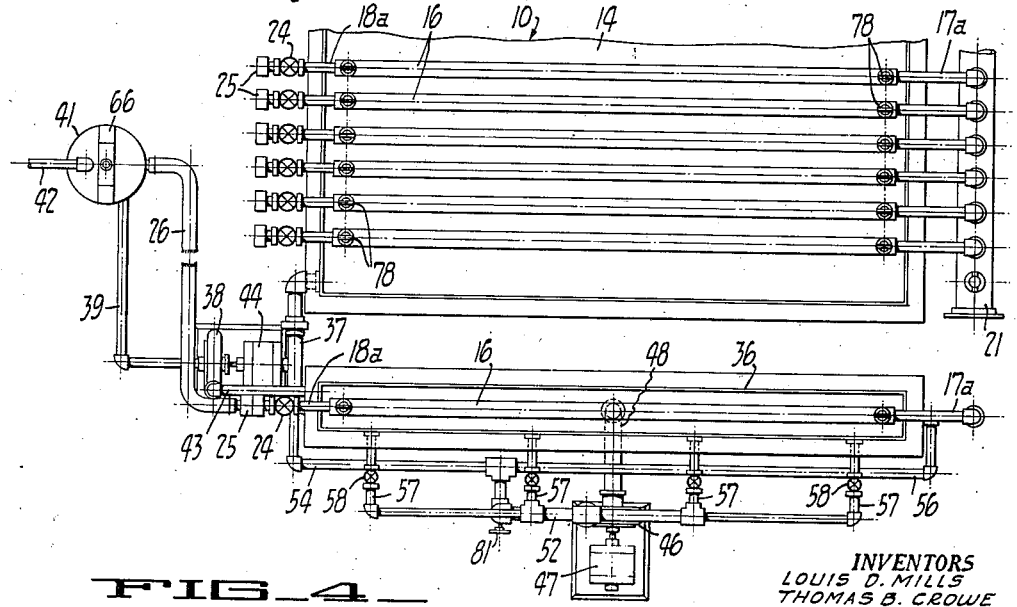

Nov. 4, 1941.    L. D. MILLS ET AL    2,261,399
CYANIDE METHOD AND APPARATUS
Filed Dec. 23, 1938    3 Sheets-Sheet 3
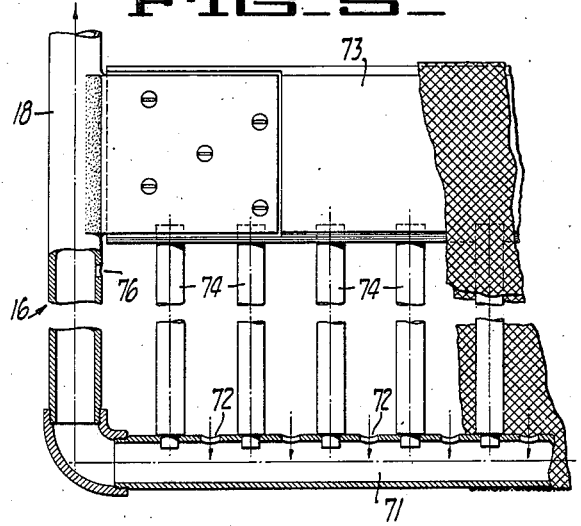
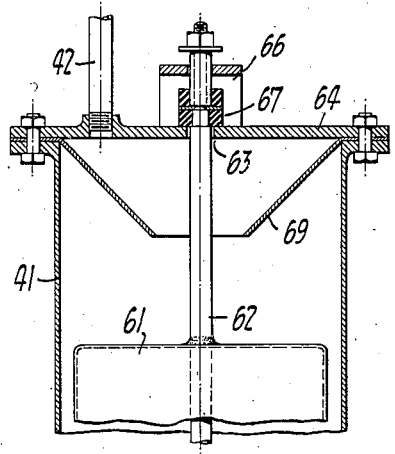
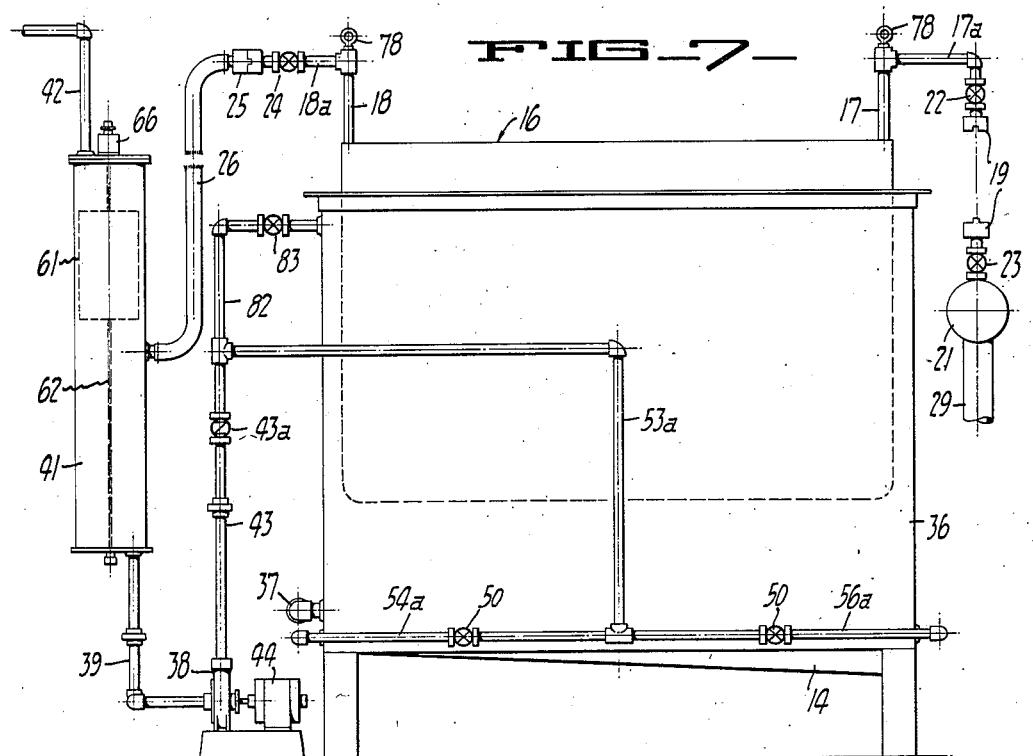

Patented Nov. 4, 1941

2,261,399

UNITED STATES PATENT OFFICE 2,261,399

CYANIDE METHOD AND APPARATUS

Louis D. Mills and Thomas B. Crowe, Palo Alto, Calif., assignors to The Merrill Company, San Francisco, Calif., a corporation of California Application December 23, 1938, Serial No. 247,442

11 Claims. (Cl. 210—153)

This invention relates generally to methods and apparatus for the treatment of cyanide solutions containing dissolved precious metal values. More specifically it relates to methods and apparatus of the type wherein a vacuum leaf filter is utilized for the purpose of clarifying the solution immediately prior to deaeration and precipitation.

It is an object of the invention to provide a method and apparatus of the above character which will make possible individual conditioning of the elements of such a clarifying filter with a filter aid such as kieselguhr or diatomaceous silica, without interrupting continued operation of the remaining elements, and with full assurance that filter leaves are properly conditioned and are operating at optimum efficiency before being returned to the filtering cycle.

A further object of the invention is to prevent possible disturbance of a precoat of filter aid after application of the same, and particularly while the precoated leaf is being re-introduced into the filter tank, and returned to filtering service.

An additional object of the invention is to insure application of a relatively uniform layer of filter aid over all of the surfaces of a filter leaf.

Further objects of the invention will appear from the following description in which the preferred embodiment of the invention has been set forth in detail, in conjunction with the accompanying drawings.

Referring to the drawings:

Fig. 3 is an end view looking towards the right hand end of the apparatus as shown in Fig. 2.

Fig. 4 is a fragmentary plan view of the apparatus illustrated in Figs. 2 and 3.

Fig. 5 is an enlarged detail view showing a type of filter leaf which can be utilized with the invention.

Fig. 6 is a cross-sectional detail showing a portion of a separator which can be employed and its float operated vent valve.

Fig. 7 is a view similar to Fig. 3, but showing a modification of the apparatus.

Figure 1:
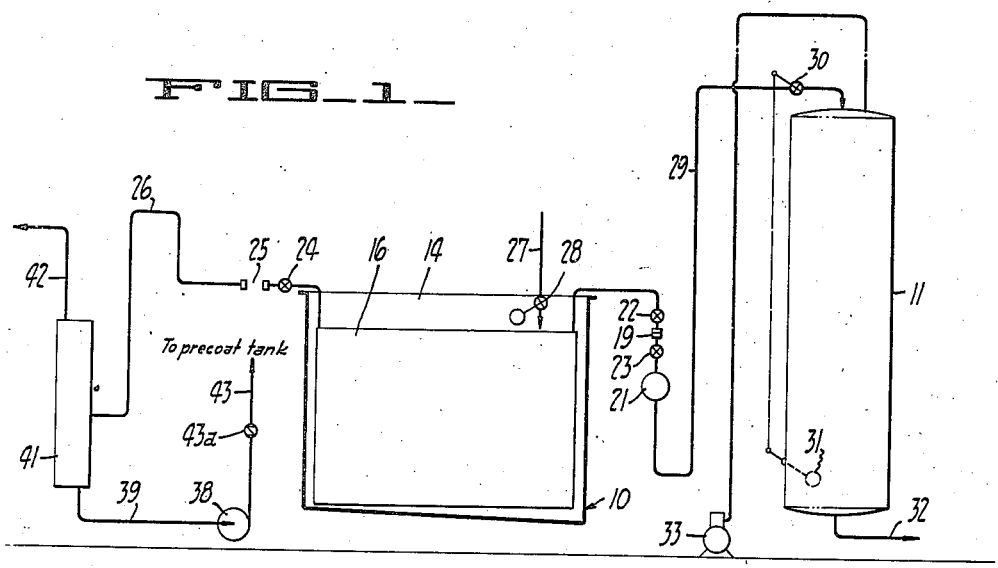
Fig. 1 is a diagrammatic flow sheet illustrating one form of apparatus incorporating the present invention.

The apparatus illustrated in Fig. 1 of the drawings includes generally a solution clarifying filter 10, and a deaerating receiver 11. As is known by those skilled in the art, settled but unclarified cyanide solution having dissolved precious metal values is supplied to the tank of the clarifying filter 10, and after being clarified the effluent flows through the evacuated receiver 11 where dissolved air is removed. The solution then flows from the deaerating receiver to suitable precipitating apparatus, which may include means for introducing a precipitant like zinc dust into the solution, and a suitable precipitating filter.

The clarifying filter 10 is of the vacuum leaf type and consists of a solution tank 14, in which a plurality of filter leaves 16 are disposed. In conventional practice such filter leaves are connected by a single riser pipe to an effluent manifold. In the present instance a detachable pipe connection is provided between each filter leaf and the effluent manifold, and the connection makes use of an additional valve or stop-cock. In addition each filter leaf is provided with a supplemental coupling and valve or stop-cock, whereby connection can be made from a source of suction to a filter leaf independent of the connection to the effluent manifold.

Connections of the type described above have been illustrated in Figs. 1 and 3 of the drawings. Each filter leaf is provided with a pair of riser pipes 17 and 18, which have lateral extensions 17a and 18a. Extension 17a is provided with a coupling 19 for making detachable connection with the effluent manifold 21, and also with a valve or stop-cock 22. Between the coupling 19 and manifold 21 there is the usual valve 23. The extension 18a on riser pipe 18 is provided with a valve 24 and coupling means 25. Coupling 25 makes possible attachment of the riser pipe 18 with an auxiliary flexible hose 26.

Solution is introduced into the main compartment of tank 14 by the solution line 27, which can be controlled by float valve 28. Flow line 29 serves to connect the effluent manifold 21 with the upper portion of the deaerating receiver 11. This line is shown being controlled by a valve 30, which in turn is controlled by a float 31 within the deaerating receiver 11. Clarified and deaerated solution is removed from receiver 11 by pipe 32, which can connect to the suction side of suitable pumping apparatus. The receiver 11 is evacuated by the pump 33.

At one end of the filter tank 14 (Fig. 2) is shown a separate precoat container or compartment 36. This container is in communication with the main filter tank through the pipe 37, so that the same solution level is maintained in this container as in the main filter tank.

To enable application of suction to an individual filter leaf for a conditioning operation, a separate solution pump 38 is provided. The suction side of this pump is connected to a pipe 39 with a separator 41, and the separator in turn connects with flexible hose 26, and with pipe 42 leading to a suitable source of suction such as a suitable evacuating pump. Pipe 43 connects the discharge side of pump 38 with the upper part of the precoat container, where its discharge is visible for inspection. It is desirable to provide this pipe with a check valve 43a, in order to prevent back flow of solution through pump 38 under certain operating conditions. In some instances pipe 43 may lead to the upper part of the main filter tank. When pump 38 is operating the stream or jet of liquid discharged from pipe 43 is clearly visible, so that it may be inspected to determine its clarity. Pump 38 is shown being driven by an electric motor 44. Separator 41 is arranged to separate liquid and air drawn through hose 26, whereby only liquid is supplied to pump 38.

Figure 2:
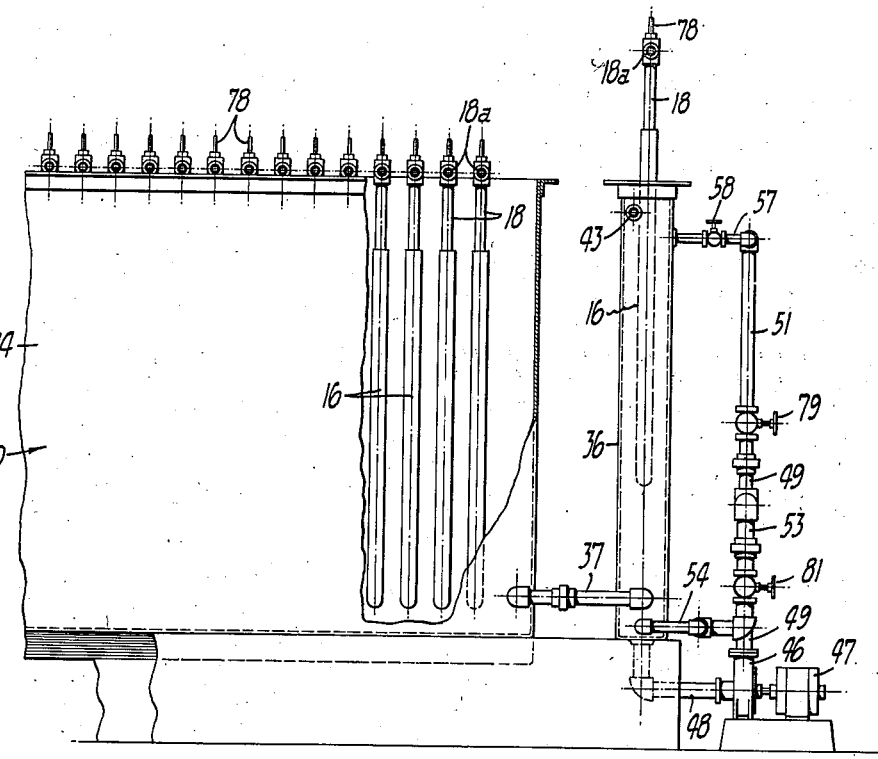
Fig. 2 is a side elevational detail, partly in cross-section, illustrating the precoat compartment and connections with the same for recirculation of solution.

In making use of the precoat container 36 a certain amount of a granular filter aid like kieselguhr or diatomaceous silica, is introduced into the container and intermixed with the solution to form a liquid suspension. In order to prevent any substantial settling out of the filter aid and in order to promote uniformity of application to a filter leaf, additional means are provided for continuously re-circulating solution through the precoat compartment, and to agitate the solution in such a manner as to prevent settling out of the filter aid in the lower part of the container. Thus a re-circulating pump 46 driven by motor 47, has its inlet connected by pipe 48 to the lower portion of the compartment 36. The discharge pipe 49 from pump 46 connects to a plurality of distributing pipes, including pipes 51 and 52, and pipes 53, 54 and 56. Pipe 52 connects with the several pipes 57, which can be provided with individual control valves 58, and which connect with the upper portion of the precoat container 36. In this instance four such pipes 57 are shown, and these pipes are spaced laterally in order that the streams of liquid which they discharge are distributed across the top of the precoat compartment. Pipes 54 and 56 connect with the ends of the container 36 at points near the bottom of the container. The level of the discharge from these pipes is somewhat below the level of the lower ends of the filter leaf, as the leaf is positioned in the container for a conditioning operation. The positioning of the filter leaf within the container 36 during a conditioning operation, is shown in Fig. 2 and in dotted lines in Fig. 3. Pipes 57 are at such a level that they discharge well above the upper edge of the filter leaf, and therefore do not tend to wash away filter aid from adjacent surfaces of the leaf. As previously stated, pipes 54 and 56 likewise discharge at a level below the edge of the filter leaf, and they serve to maintain a region of agitation in the lower part of the compartment to prevent settling out of filter aid. Also the discharge from pipes 54 and 56 causes a continual progression of filter aid centrally and toward the region of the suction pipe 48.

The separator 41 preferably makes use of a float valve arrangement such as shown in Fig. 6. In this instance there is a float 61 within the separator chamber, and this float is mounted upon a vertically slidable rod assembly 62. The upper end of rod 62 projects through an opening 63 in the top wall 64, and is loosely guided by an outer yoke 66. A valve member 67 seats upon wall 64 to close opening 63, and is mounted on the rod 62. When the valve member 67 is raised by elevation of float 61 the interior of the separator is vented to the atmosphere. An inner hood 69 insures against splashing of solution into pipe 42 or through opening 63.

A typical type of filter leaf which can be employed is shown in Fig. 5. In this instance the vertical pipes 17 and 18 connect with the lower pipe 71, which is provided with openings 72 for flow of solution from the interior of the leaf. Pipes 17, 18 and 71 form the frame of the leaf, together with the upper cross bar 73, and the vertical slats or spacing members 74. In addition to the openings 72 in the lower part of the leaf, it is desirable to provide upper openings 76 in the pipes 17 and 18, these openings being located near the upper corners of the interior of the leaf. Under certain conditions of operation as will be presently explained, openings 76 may assist in maintaining negative pressure in the interior of the filter leaf, and they prevent trapping of air in the upper part of the leaf.

If the pump 38 were simply of such capacity as to remove filtrate from the leaf at a rate comparable to what is usually experienced in a normal filtering cycle, with the interior of the leaf filled with liquid, certain of the operations to be presently described would not give optimum results at all times. For best results we prefer to utilize a pump 38 operated at such capacity for a given size and character of the filter area, that the interior of a filter leaf is at all times substantially entirely scavenged of liquid. In other words pump 38 is of such capacity that when a filter leaf is completely immersed in the solution of the filter tank or precoat container, substantially no column of liquid is maintained above openings 72, irrespective of whether the filter cloth is entirely clean, or carries some deposit of a filter aid or other solids.

To utilize the apparatus described, and in carrying out the present invention, a filter leaf remains in its normal filtering position with its riser pipe 17 connected to the effluent manifold 21, until the accumulated filter cake makes it advisable to carry out a reconditioning operation. The filter leaf to be reconditioned is disconnected with respect to the effluent manifold 21, by closing valves 22 and 23, and detaching coupling 19. Connection is now established between the filter leaf and the hose 26, by connecting coupling 25, and opening valve 24. Pipe 42 is connected to a source of suction, and pump 38 is put into operation.

Suitable hoisting equipment is now applied to the detached leaf and the leaf is lifted free of the filter tank, and transposed to a position where the accumulated filter cake can be washed away. To facilitate application of a hoist to the leaf, the riser pipes 17 and 18 are shown provided with eyelets or rings 78, with which hooks can engage. Pump 38 applies suction to the interior of the leaf so that there is no water column within the leaf tending to cause the lower part of the leaf to bulge as it is lifted. Air which may be admitted to the interior of the leaf as the leaf is exposed to the atmosphere, is withdrawn together with filtrate, and is exhausted through pipe 42.

After being removed from the main filter tank communication with the hose 26 is interrupted, as by closing valve 24, and the leaf then cleaned to remove accumulated filter cake.

After the filter leaf has been cleaned it is shifted to and lowered into the precoat container 36. In the event coupler 25 has been disconnected during the washing operation, it is reconnected and the pump 38 again put into operation. Re-circulating pump 46 is placed in operation and a given quantity of filter aid introduced into the container, either in the form of a powder or as a slurry. The continuous recirculation of the solution, together with the agitation accompanying the re-circulation, causes relative uniform admixture and distribution of the filter aid throughout the solution, and obviates any tendency for the filter aid to settle to the lower portion of the container.

Pump 38 is now placed in operation and separator 41 connected to the source of suction, as previously described. The pump 38 keeps the interior of the filter leaf substantially scavenged of liquid, or in other words no column of liquid is permitted to be maintained above the openings 72 of the filter leaf. The filtrate discharged by pump 38 is delivered by pipe 43 into the main filter tank, although the level of solution in the container 36 is maintained by virtue of flow through the connecting pipe 37. The filter aid immediately commences to deposit upon the outer surface of the filter leaf, and as circulation by pump 38 continues, substantially all of the filter aid is deposited upon the filter leaf as a precoat.

Because of the uniform distribution of the filter aid throughout the liquid within container 36, by virtue of the re-circulation through pump 46 and the pipes connecting the same, together with the fact that there is substantially no column of liquid within the filter, the filter aid is relatively uniformly distributed over the entire area of the filter cloth. To insure optimum lateral distribution of the material recirculated by pump 46, one may adjust the valves 58. Also one may adjust the valves 79 and 81 to secure a desired distribution to the upper and lower portions of the container.

The end of the precoat cycle is indicated by relatively clear solution within the precoat compartment. The operator now re-engages the hoist with the filter leaf and elevates it clear of the precoat compartment, during which time the pump 38 continues in operation. As the upper edge of the leaf is exposed to the atmosphere, air is sucked into the filter leaf and is withdrawn through openings 72 and 76, together with filtrate.

It may be explained that when the filter leaf is completely immersed, the flow of solution into the separator 41 may be greater than can be handled by the pump 38, operating under a relatively high vacuum on the suction side. Under such condition the solution raises in separator 41, ultimately causing float 61 to raise and open valve 67. This reduces the vacuum within the separator 41, and enables pump 38 to handle a greatly increased flow, thus automatically balancing the capacity of the pump to the varying flow of solution into the separator 41. As the filter leaf is exposed to the atmosphere the solution entering separator 41 rapidly decreases with the result that valve 67 remains closed. Therefore as air is sucked through the hose 26 from the filter, and is delivered into the separator 41, it is immediately withdrawn through the pipe 42 to maintain the desired negative pressure in the leaf. It will be evident that withdrawal under such conditions avoids any possible bulging of the lower part of the filter cloth, such as would be occasioned by the existence of a water column in the filter leaf at the time of its withdrawal. Any bulging of the filter cloth during its removal from the precoat container, with solution passing outwardly through the filter fabric, would tend to seriously disturb the precoat.

While the filter leaf is being transposed back to the filter tank it is desirable to permit pump 38 to operate and to continue application of pneumatic suction, particularly as the leaf is lowered into the filter tank. During the interval that the leaf is completely exposed to the atmosphere, the pump 38 may completely empty separator 41 and under such a condition check valve 43a prevents air from entering the separator through the pump and therefore application of suction to the interior of the leaf is continued by the suction applied from pipe 42. As the filter leaf is lowered into the main filter tank, filtrate is withdrawn immediately as the lower portion of the leaf is immersed. When the leaf is completely immersed no further air from the atmosphere is drawn into the leaf, and thereafter the opening and closing of valve 67 by float 61 regulates the pump capacity to the inflow of solution to the separator. Here again it will be apparent that continued application of suction to the leaf as it is lowered into the main filter tank, prevents any bulging of the upper portion of the filter leaf due to trapped air within the leaf, because such untrapped air will be withdrawn through vent 76.

After being lowered to final position within the main filter tank, application of suction through hose 26 is continued while the operator inspects the discharge of the filtrate from pipe 43, to determine if the filtrate is of the proper sparkling character. If the filtrate discharged is cloudy, then circulation through pump 38 is continued until proper clarity is attained. Coupling 19 is now reconnected and valves 22 and 23 are opened to establish suction to the manifold 21. Thereafter valve 24 is closed and operation of pump 38 is discontinued. Hose 26 can now be disconnected for use in connection with another filter leaf.

Check valve 43a prevents any possible back suction through pump 38, such as might destroy its proper primed condition and break the partial vacuum in the separator. The float controlled vent valve for the separator 41 prevents the possibility of solution being drawn up through pipe 42, during intervals when the filter leaf is completely immersed in solution. Should one permit this to occur it would interfere with immediate and continued application of suction as the leaf is initially lifted from the precoat container and its upper portion exposed to the atmosphere.

A modified form of apparatus is shown in Fig. 7, in which pump 46 has been omitted, and the discharge from pump 38 employed for preventing settling out of the filter aid in container 36. Thus in this instance the discharge pipe 43 from pump 38, connects with pipes 53a, 54a and 56a. Pipes 54a and 56a correspond to pipes 54 and 56 of Fig. 3, in that they connect into the lower ends of the compartment 36 at points below the level of a filter leaf being conditioned. Valves 50 can be inserted in these pipes to control distribution of the discharge. For visually inspecting the effluent handled by pump 38, a branch pipe 82 leads to the upper part of the precoat container, and is provided with a test cock 83.

Operation of the modification of Fig. 7 is substantially the same as that described for Figs. 1 to 6 inclusive, except that in this case the discharge of filtrate from pipes 54a and 56a causes sufficient agitation within container 36 to prevent serious settling out of filter aid, during a precoating operation. After a precoated leaf has been returned to the main filter tank, cock 83 can be opened to permit visual inspection of the filtrate.

We claim:

1. In a method of filtering cyanide solution in making use of a filter of the vacuum leaf type, in which a plurality of individual filter elements are disposed within the solution tank and normally connected to a common effluent line, the steps of detaching a filter leaf from the effluent line and transposing the same from the filter tank into a separate precoat tank or compartment, maintaining a suspension of a filter aid within the precoat compartment by continuously agitating and re-circulating solution through the compartment, and applying suction to the leaf to cause a coating of the filter aid to deposit on the same.

2. In a method of filtering cyanide solutions making use of a filter of the vacuum type in which a plurality of individual filter leaves are disposed within the solution tank and are normally connected to an effluent line, the steps of detaching a filter leaf from the effluent line and transposing the same from the filter tank into a separate precoat tank or compartment, maintaining a liquid suspension of the filter aid within the precoat compartment by continuously agitating and recirculating the same through the compartment, the re-circulation being such as to distribute the liquid being re-circulated into the upper part of the compartment, and applying suction to the leaf while in the precoat compartment to cause a coating of the filter aid to be deposited on the same.

3. In a method of filtering cyanide solution making use of a filter of the vacuum leaf type in which a plurality of individual filter leaves are disposed within the solution tank and are normally connected to an effluent line, the steps of detaching a filter leaf from the effluent line and transposing the same from the filter tank into a separate precoat tank or compartment, maintaining a liquid suspension of a filter aid within the precoat compartment by continuously agitating and re-circulating solution through the compartment, and applying suction to the leaf while in the compartment to cause a coating of the filter aid to be deposited on the same.

4. In a method of applying a precoat of a filter aid to vacuum filter leaves, immersing the leaf in a liquid suspension of a filter aid, and withdrawing solution from the filter leaf at such a rate that there is substantially no column of liquid within the leaf.

5. In a method of filtering cyanide solution making use of a filter of the vacuum type in which a plurality of individual filter leaves are disposed within a solution tank and are normally connected to an effluent line, the steps of placing a filter leaf, while detached from the effluent line, in a separate precoat container or compartment, maintaining a liquid suspension of filter aid within the precoat container, withdrawing filtrate from the interior of the leaf at such a rate that substantially no column of filtrate is maintained within the leaf and whereby the filter aid is coated on the leaf, transposing the leaf back into the main filter tank, applying suction to the leaf as it is lowered into the main filter tank, and then establishing communication between the leaf and the effluent line of the filter.

6. Apparatus for conditioning vacuum filter leaves used in the clarification of cyanide solutions preparatory to deaerating and precipitating the same, the apparatus comprising a filter tank, a plurality of vacuum filter leaves suspended in said tank, couplings and valves on each leaf permitting detachable connection and interruption of flow to either of two outlets, a separate precoat compartment having a solution connection with the filter tank, independent means for applying suction to each outlet, and additional means for effecting a re-circulation of solution through the precoat compartment whereby a filter aid introduced into said precoat compartment is maintained in suspension.

7. In apparatus of the character described for clarification of cyanide solution, a filter tank, a vacuum effluent manifold, a plurality of filter leaves in the filter tank and detachably connected to the manifold, a separate precoat compartment or container, said compartment having a solution connection to the filter tank, means including a pump adapted to be connected to a filter leaf whereby a filter leaf detached from the manifold and introduced into said precoat compartment can be subjected to suction for a conditioning operation, and means for continuously re-circulating solution through the precoat compartment and for maintaining a zone of agitation within the lower portion of the compartment.

8. In apparatus of the character described for clarification of cyanide solution, a filter tank, a plurality of filter leaves in the filter tank detachably connected to a common effluent manifold, a separate precoat compartment or container, and means including a pump adapted to be connected to a filter leaf, whereby a filter leaf detached from the manifold and disposed in said precoat compartment can be subjected to suction for a precoat operation, said pump having a capacity such that solution is withdrawn from the filter leaf at a rate sufficient to maintain the interior of the leaf substantially entirely scavenged of filtrate.

9. In apparatus of the character described for clarification of cyanide solution, a filter tank, a vacuum effluent manifold, a plurality of filter leaves in the filter tank and detachably connected to the manifold, a separate precoat compartment or container, a solution pump independent of the effluent manifold, means forming a detachable connection between the inlet side of the pump and a filter leaf while the leaf is disconnected from the manifold and is within the precoat compartment, and means connected to the discharge side of the pump for returning filtrate from the leaf to the lower portion of the precoat compartment to thereby agitate solution in the compartment.

10. In apparatus of the character described for the clarification of cyanide solution, a filter tank, a plurality of filter leaves in the filter tank detachably connected to a common effluent manifold, and means for applying suction to a leaf in the tank while the leaf is disconnected from the effluent manifold, said means including a solution pump having a capacity such that solution is withdrawn from the leaf at a rate sufficient to maintain the interior of the leaf substantially entirely scavenged of filtrate while the leaf is being withdrawn from the solution of the tank.

11. In apparatus of the character described for clarification of cyanide solution, a filter tank, a plurality of filter leaves in the tank, an effluent manifold having detachable connection with the filter leaves, a separate precoat compartment or container adapted to contain solution and to receive a filter leaf which is detached from the manifold, a solution pump independent of the effluent manifold, a closed separating chamber, having its lower portion connected to the inlet of the pump, the upper part of the chamber being adapted for connection to a source of pneumatic suction, a float within the chamber, a valve actuated by the float and serving to control venting of the chamber to the atmosphere when the liquid level in the chamber rises above a predetermined level, and a suction pipe connected to the chamber and adapted to be coupled to a filter leaf whereby suction can be applied to a leaf to remove effluent while the leaf is within the precoat compartment and to remove both effluent and air while the leaf is being removed from the precoat compartment.

LOUIS D. MILLS.
THOMAS B. CROWE.